(12) United States Patent
Kang et al.

(10) Patent No.: US 12,124,698 B2
(45) Date of Patent: Oct. 22, 2024

(54) COMPUTER SYSTEM FOR HYBRID OF EPOCH- AND POINTER-BASED MEMORY RECLAMATION, AND METHOD THEREOF

(71) Applicant: Korea Advanced Institute of Science and Technology, Daejeon (KR)

(72) Inventors: Jeehoon Kang, Daejeon (KR); Jaehwang Jung, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 395 days.

(21) Appl. No.: 17/510,149

(22) Filed: Oct. 25, 2021

(65) Prior Publication Data

US 2022/0187986 A1    Jun. 16, 2022

(30) Foreign Application Priority Data

Dec. 11, 2020   (KR) .................. 10-2020-0172853

(51) Int. Cl.
*G06F 3/06* (2006.01)
*G06F 12/02* (2006.01)

(52) U.S. Cl.
CPC .......... *G06F 3/0604* (2013.01); *G06F 3/0655* (2013.01); *G06F 3/0679* (2013.01); *G06F 12/0276* (2013.01); *G06F 12/0269* (2013.01)

(58) Field of Classification Search
CPC ........ G06F 3/06; G06F 3/0659; G06F 3/0679; G06F 3/0655; G06F 3/0604; G06F 12/0276; G06F 12/0269
See application file for complete search history.

(56) References Cited

U.S. PATENT DOCUMENTS

| | | | |
|---|---|---|---|
| 2017/0147487 A1* | 5/2017 | Kogan | G06F 9/5022 |
| 2017/0285948 A1* | 10/2017 | Thomas | G06F 3/0616 |
| 2018/0011893 A1* | 1/2018 | Kimura | G06F 16/283 |
| 2018/0253311 A1* | 9/2018 | Parkinson | G06F 8/30 |
| 2019/0073591 A1* | 3/2019 | Andoni | G06N 3/126 |
| 2019/0235933 A1* | 8/2019 | Levandoski | G06F 9/30043 |
| 2020/0034450 A1* | 1/2020 | Layton | G06F 9/54 |

FOREIGN PATENT DOCUMENTS

WO    WO-2018046085 A1 *    3/2018    ......... G06F 16/1767

OTHER PUBLICATIONS

Balmau, Oana et al., "Fast and Robust Memory Reclamation for Concurrent Data Structures", Proceedings of the 28th ACM Symposium on Parallelism in Algorithms and Architectures [online], Association for Computing Machinery, Jul. 11, 2016 pp. 349-359, https://dl.acm.org/doi/abs/10.1145/2935764.2935790.
Kang et al. "A Marriage of Pointer- and Epoch-Based Reclamation," 15 pages, International Conference on Programming Language Design and Implementation (PLDI '20), Jun. 15, 2020.

* cited by examiner

*Primary Examiner* — Pierre Michel Bataille
(74) *Attorney, Agent, or Firm* — Christensen O'Connor Johnson Kindness PLLC

(57) ABSTRACT

Various example embodiments provide a computer system for hybrid of epoch- and pointer-based memory reclamation, and a method thereof. Various example embodiments are configured to implement a pointer and epoch-based memory reclamation scheme by hybridizing a pointer-based memory reclamation scheme and an epoch-based memory reclamation scheme, and perform a memory reclamation of a concurrent data structure, based on the pointer and epoch-based memory reclamation scheme.

17 Claims, 7 Drawing Sheets

FIG. 2

```
1   struct Node<T> { Node<T>* next; T data; };
2   struct Stack<T> {
3      Atomic<Node<T>*> head;                    // nullptr, initially
4      void push(T data) {
5         auto node = new Node<T>{nullptr, data};
6         do {
7            auto cur = this -> head. load();
8            node -> next = cur;
9         } while (! this ->head.cas(cur, node));
10     }
11     optional<T> Stack<T>: :pop() {
12        auto cur = nullptr;
13        loop {
14           cur = this ->head.load()
15           if (cur == nullptr) return {};
16           auto next = cur -> next;
17           if (this -> head.cas(cur, next)) {
18              free(cur); break;                 // unsafe reclamation
19           }
20        }
21        return std : : move(cur -> data);
22     }
23  }
```

FIG. 5

```
1   struct Node<T> { Node<T>* next; T data; };
2   class Stack<T> {
3     Atomic<Node<T>*> head;        // nullptr, initially
4     void push(T data) {
5       auto node = new Node<T>{nullptr, data};
6       Guard g;                    //    set_active
7       do {
8         auto cur = this -> head. load(&g);
9         node -> next = cur;
10      } while (! this ->head.cas(cur, node,&g));
11    }                             //    set_quiescent
12  optional<T> Stack<T>: :pop() {
13    auto cur = nullptr;
14    Shield shield;                // acquires an HP slot
15    loop {
16      Guard g;                    //    set_active
17      cur = this ->head.load(&g);
18      if (cur == nullptr) return {};
19      if (! shield.protect(cur, &g)) continue;
20      auto next = shield.deref().next;   //   cur -> next
21      if (this -> head.cas(cur, next, &g)) {
22        retire(cur, &g); break;
23      }
24    }                             //    set_quiescent
25    return std : : move(shield.deref().data);
26  }                               // unprotects the HP slot
27  }
```

# COMPUTER SYSTEM FOR HYBRID OF EPOCH- AND POINTER-BASED MEMORY RECLAMATION, AND METHOD THEREOF

This application claims the priority benefit of Korean Patent Application No. 10-2020-0172853, filed on Dec. 11, 2020, in the Korean Intellectual Property Office, the disclosure of which is incorporated herein by reference.

BACKGROUND

1. Field of the Invention

The follow example embodiments relate to a computer system for hybrid of epoch- and pointer-based memory reclamation, and a method thereof.

2. Description of Related Art

To efficiently use many cores of a computer CPU, concurrent data structures that many cores may access simultaneously should be used. The concurrent data structures mean data structures in which data may be included and removed simultaneously in multiple threads. Since the concurrent data structures should consider and regulate interaction of multiple threads at once, it is much more complex than sequential data structures that one thread may access. This is especially in a memory reclamation, since, in the concurrent data structure, even after one thread extracts data, the data may be accessed from another thread. After it is confirmed that data may never be accessed from other threads, a memory having the data may be reclaimed.

Since a memory reclamation in the concurrent data structure is very difficult problem, various schemes have been proposed to solve only this problem. The most famous scheme is a pointer-based memory reclamation scheme and an epoch-based memory reclamation scheme. The pointer-based reclamation scheme has advantages that it uses less memory and may reclaim all memory, but has disadvantages that it may not be applied to many data structures. On the other hand, the epoch-based memory reclamation scheme has advantages that it uses less memory, is fast, and may be applied to many data structures, but it has disadvantages that it may not reclaim all memory.

The various example embodiments provide a reclamation scheme having advantages of two schemes by hybridizing a pointer-based memory reclamation scheme and an epoch-based memory reclamation scheme. A PEBR (pointer-and-epoch-based memory reclamation scheme) according to the various example embodiments is a combination of algorithms of two schemes, so it uses less memory, is fast, and may be applied to many data structures, and reclaim all memory.

A method by a computer system according to various example embodiments may include implementing a pointer and epoch-based memory reclamation scheme by hybridizing a pointer-based memory reclamation scheme and an epoch-based memory reclamation scheme, and performing a memory reclamation of a concurrent data structure, based on the pointer and epoch-based memory reclamation scheme.

A computer system according to various example embodiments may include a memory and a processor, and the processor may be configured to implement a pointer and epoch-based memory reclamation scheme by hybridizing a pointer-based memory reclamation scheme and an epoch-based memory reclamation scheme, and perform a memory reclamation of a concurrent data structure, based on the pointer and epoch-based memory reclamation scheme.

A non-transitory computer readable medium according to various example embodiments may store at least one program executing for implementing a pointer and epoch-based memory reclamation scheme by hybridizing a pointer-based memory reclamation scheme and an epoch-based memory reclamation scheme, and performing a memory reclamation of a concurrent data structure, based on the pointer and epoch-based memory reclamation scheme.

The various example embodiments may use less memory, be fast, be applied to many data structures, and reclaim all memory by using a pointer and epoch-based memory reclamation scheme in which a pointer-based memory reclamation scheme and an epoch-based memory reclamation scheme.

BRIEF DESCRIPTION OF THE DRAWINGS

These and/or other aspects, features, and advantages of the disclosure will become apparent and more readily appreciated from the following description of embodiments, taken in conjunction with the accompanying drawings of which:

FIG. 2 is a drawing illustrating Treiber's stack with unsafe reclamation;

FIG. 5 is a drawing illustrating Treiber's stack protected according to various example embodiments;

DETAILED DESCRIPTION

Hereinafter, embodiments of the disclosure are described in detail with reference to the accompanying drawings.

1. Introduction

All pointer-based concurrent data structures including queues, B-trees, hash tables, work-stealing deques, radix trees, and tries should deal with the problem of safe memory reclamation. Before reclaiming a memory block, a thread should ensure no other threads hold a local pointer to the block that may later be dereferenced. Thus, in general, a memory block detached from a data structure should not be immediately reclaimed.

Figure 1:
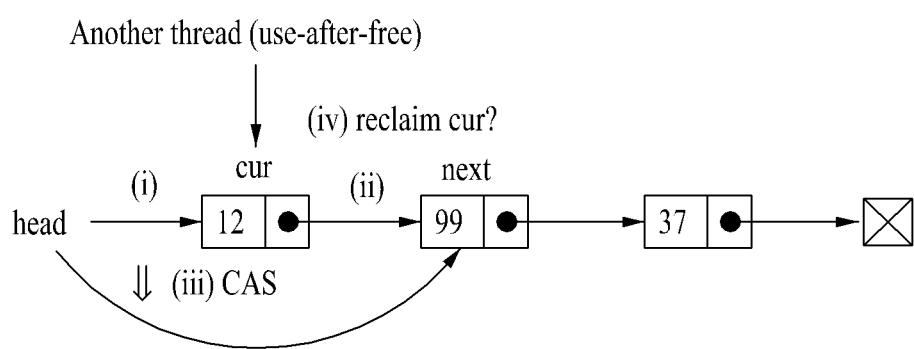
FIG. 1 is a drawing illustrating a scenario in Treiber's stack in the absence of safe memory reclamation scheme.

For example, consider Treiber's stack, which is basically a linked list of elements with head being the stack top. As illustrated in FIG. 1, a thread pops an element from the stack by (i) traversing the first block, say cur, from the head; (ii) traversing the second block, say next, from cur; (iii) detaching cur by performing CAS (compare- and swap) on the head from cur to next. What happens if (iv) cur is immediately reclaimed? Then another thread may have a local pointer to cur and dereference cur's next pointer in the middle of pop operation, thereby causing use-after-free. To prevent such an error, a thread should defer the reclamation of cur until all the other threads finish referencing it. Deferring memory reclamation requires non-trivial cooperation of multiple threads that is usually taken care of by a safe memory reclamation scheme, a library or a runtime system that detects when it is safe to reclaim memory blocks, and does so upon the user's request. Thanks to such a scheme, data structure writers may focus on its operations, leaving (most of) the duty of safe memory reclamation to the underlying scheme.

Many reclamation schemes of different trade-offs have been proposed. Unfortunately, none of the existing schemes satisfy the following desired properties at the same time: Robust: a non-cooperative thread does not prevent the other threads from reclaiming an unbounded number of blocks; Fast: significant time overhead is not incurred due to expensive fence synchronization for each dereference to the shared memory; Compact: significant space overhead is not incurred due to per-block metadata; Self-contained: it neither relies on special hardware/OS supports nor intrusively affects execution environments (e.g., installing an interrupt handler); and Widely applicable: it supports a variety of data structures without significant restrictions.

Tracing garbage collectors (GC) are neither fast nor compact because tracing incurs high and unpredictable time (latency) and space (memory usage) overhead. It is particularly problematic if the memory is large, the workload is resource-tight, or one needs to implement a GC runtime itself. Furthermore, for GC to be robust, the target language should be type-safe like Java or Haskell.

The pointer-based reclamation schemes (PBR), such as hazard pointer (HP) and pass-the-buck, are not fast because each dereference to the shared memory requires read-after-write (RAW) synchronization. I.e., an expensive fence should be inserted to order a read after a previous write. Drop-the-anchor significantly reduces PBR's synchronization cost, but it is currently applicable to lists only. Furthermore, PBR is not widely applicable in that it does not support Harris's and Harris-Herlihy-Shavit's lists. The epoch-based reclamation schemes (EBR) are not robust because a non-cooperative thread may block the advancement of the epoch (logical timestamp), thereby preventing most blocks from reclamation.

For fast and robust reclamation, hybrids of HP and EBR have been proposed. Hazard Eras and Interval-Based Reclamation (IBR) are variants of EBR which limit the effect of a non-cooperative thread by employing the idea of HP, but they are not compact due to per-block runtime metadata. QSence is a hybrid of HP and EBR that switched between them depending on the workload, but it is not self-contained due to its reliance on temporal control of OS scheduling.

In the disclosure, PEBR is proposed, and PEBR is the first safe memory reclamation scheme that satisfies all the properties above. PEBR is inspired by Snowflake's hybrid design of HP and EBR that is mostly robust (like HP) and fast (like EBR). Snowflake is also compact in that it does not incur per-block space overhead. However, Snowflake is not self-contained in that its design is tightly coupled with GC. In the first place, Snowflake's main motivation is selectively providing manual memory reclamation on the GC runtime of .NET Core. Furthermore, Snowflake is not applicable to most pointer-based nonblocking data structures due to its limited programming API mandated by safe inter-operation with GC. Crucially, Snowflake does not support pointer aliasing to memory blocks. Lastly, Snowflake's ejection algorithm is actually not robust in a strict sense because its ejection algorithm is protected by locks.

PEBR is also a fast and compact hybrid of HP and EBR, but without the limitations of Snowflake discussed above. PEBR is self-contained in that it employs a lightweight runtime that does not rely on GC and requires only the standard C/C++ concurrency features and process-wide memory fence, the latter of which is widely available to user-space programs on Linux and Windows. PEBR is robust. In particular, the disclosure designs a nonblocking ejection algorithm. Most importantly, PEBR is widely applicable in that PEBR allows pointer operations that are widely used in concurrent programming, such as pointer aliasing, pointer tagging, and read-modify-write (RMW) operations (e.g., CAS and fetch- and add). Furthermore, the disclosure characterizes PEBR's requirements for safe reclamation that is satisfied by a variety of nonblocking data structures, including Harris's and Harris-Herlihy-Shavit's lists and other supported by EBR.

The disclosure implemented PEBR on top of Cossbeam, an EBR implementation written in Rust. The disclosure's implementation is publicly available. To experimentally evaluate whether PEBR is fast and robust, the disclosure compares its performance with that of EBR and NR (no reclamation), using several data structure microbenchmarks such as the linked lists of Harris, Harris-Michael, and Harris-Herlihy-Shavit, Michael's hash map, and Natarajan-Mittal's tree. In the experiment, PEBR is comparably fast with EBR (incurring less than 15% throughout drop) while being robust (successfully reclaiming memory even in hostile environment).

In the rest of the disclosure, PEBR is explained and evaluated in detail. First, it reviews the prior reclamation schemes that inspire the design of PEBR, namely PBR, EBR, Snowflake, presents PEBR's requirements, presents a high-level API that automatically guarantees some of the requirements, explains PEBR's algorithm, including its nonblocking ejection algorithm, and discusses PEBR's properties.

2. Prior Schemes

Using Treiber's stack as running example (§ 2.1), it explains how prior schemes prevent use-after-free errors and discusses their drawbacks (§ 2.2 to 2.4).

2.1 Example: Treiber's Stack

FIG. 2 presents Treiber's stack with unsafe reclamation. It was described above that Treiber's stack is basically a linked list of elements with head being the stack top. (Line 1, or L1) The structure Node<T> represents a linked list node, which consists of the data and the next pointer. (L2-3) A stack<T> is basically an Atomic pointer to Node<T>, which is initially nullptr. (L4-10) The push method creates a new node that points to the current head as the next pointer, and performs CAS on the head from the current one to the new node. In doing so, it creates a local copy cur of the pointer this→head to shared memory for reference purposes. (L11-22) On the other hand, the pop method loads the current head, creating a local pointer cur, and if it is not nullptr, reads its next pointer and performs CAS on the head from the current node to the next. (L9,20) Both push and pop methods retry until the CAS succeeds.

As described above, in pop, (L18) it is unsafe to reclaim cur immediately read cur→next, causing a use-after-free error. In the rest of this section, it explains how to prevent such an error by protecting local pointer dereferences with reclamation schemes.

2.2. Hazard Pointer

First, the hazard pointer scheme (HP), which is one of the earliest and the most basic PBR schemes, is explained.

API: HP provides the following functions.

protect(1): protecting the given local pointer, say 1, to the shared memory. Only protected local pointer should be dereferenced. It adds 1 to the calling thread's protected pointer list (or "hazard pointer" list). After protection, the user is required to validate that the shared location from which the user reads 1, still contains 1.

unprotect(1): releasing the protection of 1 by removing 1 from the protected pointer list.

retire(1): requesting the reclamation of the referent of 1. The user is required to make sure a pointer is unlinked, i.e., no longer present in shared memory before retiring it. For the precise definition of unlinking, § 3.3 is referred. It adds 1 to the calling thread's thread-local reclamation list.

collect( ) reclaiming the retired block that are no longer protected by any threads, i.e., those pointers in the reclamation list but not in any thread's protected pointer lists. It may be called by the user or by the runtime itself to guarantee robustness.

Treiber's stack presented in FIG. 2 is changed as follows.

Before L16, protect(cur); if (this→head. load ( )!=cur) continue; is inserted.

After L16, unprotected (cur); is inserted.

At L18, free (cur) is replaced with retire(cur).

Safety: The API's requirements are satisfied in that cur is (L16) dereferenced only if it is protected and validated beforehand, and (L17, 18) cur is detached from shared memory before retired.

For example, use-after-free of cur is prevented thanks to synchronization among protect, retire, and collect. First, protect(cur) proceeds as follows:

P1. cur is added to the thread's protected pointer list.

P2. It is checked whether head→next still contains cur, as required by the API.

Second, after required, cur is collected as follows:

C1. Assume cur is no longer present in shared memory, as required by retire(cur).

C2. Read the protected pointer lists of all the threads.

C3. Reclaim cur if it is not protected by any threads.

Now depending on the execution order, P1 happens before C2 or C1 happens before P2. In the former case, cur is published as protected and thus is not reclaimed in C3. In the latter case, cur is no longer present in shared memory and thus P2's validation fails. In either case, use-after-free never happens for cur.

Drawbacks: While intuitive, HP is not fast due to expensive synchronization. For the above case analysis to be sounded, the order between P1's write (and C1's) and P2's read (and C2's, resp.) should be enforced by issuing RAW-synchronizing fences. In particular, a fence should be issued for each pointer protection and thus each pointer dereference. Furthermore, HP is not widely applicable in that, as discussed in the original HP disclosure, their ability to protect an individual pointer is insufficient for supporting iterations in Harris's and Harris-Herlihy-Shavit's lists (see § 3.3 for details). These disadvantages motivate other reclamation schemes like EBR.

2.3. Epoch-Based Reclamation

EBR schemes, such as Harris's version, Fraser's version, and QSBR, all amortize the synchronization cost by protecting multiple local pointers at once.

API: EBR provides the following functions:

set_active( ) set_quiescent( ) indicating whether a thread is accessing shared memory ("active state") or not ("quiescent state"). The user should make sure (i) shared memory is accessed only inside an active state; and (ii) a local pointer created in an active state by reading shared memory, should be dereferenced only in the same active state without switching to a quiescent state.

retire(1): requesting the reclamation of the referent of 1. It has a similar requirement to HP's. In addition, it should be called in an active state.

collect( ) reclaiming those blocks that are required in an old enough active state.

Treiber's stack presented in FIG. 2 is changed as follows:

Before L6, 13, set_active( ) is inserted.

After L9, 20, set_quiescent( ) is inserted.

At L18, free (cur) is replaced with retire(cur).

The API's requirements are satisfied in that cur is (L7, 14) created in an active state; (L16) dereferenced in the same active state; and (L17, 18) detached from shared memory before retired in an active state.

Safety: Use-after-free is prevented thanks to epoch consensus synchronization among the threads, in which (i) an active thread is pinned at a local epoch; (ii) the local epochs of concurrent active threads may be different, but they are guaranteed not to skew too much; and (iii) only those pointers retired at old enough epochs are reclaimed. As a result, the reclaimed blocks cannot be (de) referenced in the active threads currently pinned at recent epochs.

Figure 3:
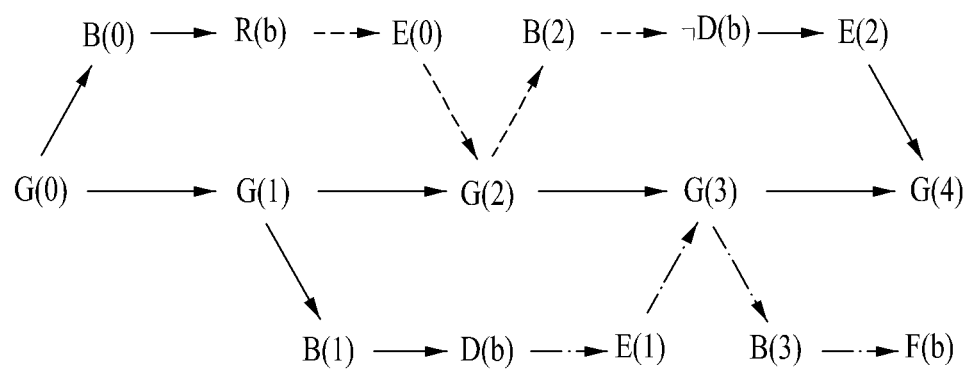
FIG. 3 is a drawing illustrating an epoch consensus example.

More specifically, see an example event graph presented in FIG. 3, where a node represents an event and an edge represents the happens-before relation. B(e) and E(e) represent the beginning and end of an active state, say A(e), pinned at local epoch e. In epoch consensus, the threads cooperatively and periodically advance the global epoch, whose advancement to e is represented as G(e). Global epoch prevents the local epochs from skewing too much by guaranteeing, for each A(e), that (i) G(e) happens before B(e), and (ii) E(e) happens before G(e+2). In an active state A(e), only those pointers retired in an active state pinned at e−3 or earlier are reclaimed.

Epoch indeed prevents use-after-free of, e.g., b in FIG. 3, where R(b) in A(0) represents the retirement of the block b; D(b) in A(1), a dereference to b; and F(b) in A(3), the reclamation of b. Why? (−− ▶ ) First, a local pointer to b cannot be created and dereferenced inside active states pinned at 2 (or later), because b is unlinked from shared memory before R(b), E(0), G(2), B(2). (———▶) On the other hand, a dereference to b inside A(1) (or earlier), e.g., D(b), happens before E(1), G(3), B(3), and then F(b).

Epoch significantly reduces synchronization cost because RAW synchronization happens not for each dereference but only at the beginning of each active state. Specifically, RAW synchronization is necessary at B(e) to publish that the epoch e is protected, as in the same manner with HP's P1 (§ 2.2), thereby preventing the global epoch from advancing to e+2.

Drawbacks: While fast, EBR is not robust in that a non-cooperative thread may not exit an active state, thereby blocking global epoch advancement and preventing the reclamation of newly retired blocks. In essence, EBR trades robustness to be fast by protecting possibly unbounded number of local pointers. Due to the lack of robustness, it is undesirable to use EBR for protecting long-running operations, e.g., object cache or OLAP workloads.

2.4. Snowflake

Snowflake is a hybrid of HP and EBR. To be fast, it works as if it is EBR at the beginning; to be robust and reduce the peak memory usage, it ejects non-cooperative threads, if exists, from active to quiescent state and individually protects each of their local pointers from reclamation like in HP. Then the global epoch can be advanced and retired blocks be reclaimed, thereby guaranteeing robustness.

API: Snowflake has almost the same API with HP, and in particular, requires the user to protect local pointer before dereferencing it even though it is protected by epoch consensus. The reason is the epoch consensus may eject a thread and revoke its protection of the local pointer, and if it is the case, the pointer should become protected by means of HP. As a result, the requirement for protection is similar to and yet slightly different from that for HP as follows:

- A local pointer created in an active stat, should be protected only in the same active state without switching to a quiescent state due to ejection. Compare this requirement with EBR's that a local pointer created in an active state, should be dereferenced in the same active state.
- In protect(1), after adding 1 to the protected pointer list, Snowflake returns whether the thread is not ejected and still active. The user is required to validate the return value of protect(1) before dereferencing it in order to make sure the pointer is indeed protected by epoch consensus. Compare this requirement with HP's that the user to validate that the shared location from which the user reads 1, still contains 1.

In addition, Snowflake provides set_active( ) to rejoin the ejected thread to epoch consensus. Snowflake does not provide set_quiescent( ) but it is believed that it is straightforward to add the function to the API.

Treiber's stack presented in FIG. 2 is changed as follows:
Before L16, if (!protect(cur)) {set_active( ) continue;} is inserted.
After L16, unprotected (cur); is inserted.
At L18, free (cur) is replaced with retire(cur).
The change is the same with that for HP except that the user validates by checking the return value of protect(cur) instead of by rereading from this→head.

Safety: In the absence of ejection, Snowflake prevents use-after-free in the same way with EBR. A local pointer created inside an active state is safe to (protect and) dereference inside the same active state thanks to epoch consensus.

Even if a thread is ejected, its protected local pointer is still safe to dereference because (i) the validation after protect(1) guarantees the pointer is added to the thread's protected pointer list in an active state; and (ii) Snowflake's ejection algorithm makes sure the pointer added to the list during an active state becomes visible to the other threads so that they refrain from reclaiming it. Under the hood, a thread's protected pointers are only tracked in an active state, and are published to the other threads only when it is ejected. Compare this algorithm with HP's in which protect (1) immediately publishes the pointer to the other threads.

Drawbacks: Snowflake is not applicable to most non-blocking data structures due to the constraint from Snowflake's main motivation, i.e., selectively providing manual memory reclamation on .NET Core [21]. Specifically, .Net Core's requirement for strong type safety clashes with nonblocking programming as follows.

First, Snowflake requires unique owner condition: a manually managed block should be pointed to by at most a single owner (except by each thread's local pointers). As a result, Snowflake forbids multiple pointers in a concurrent data structure to be aliased. This requirement is motivated by strong type safety: in essence, under this condition, as soon as a block is relinquished by its single owner, the block automatically satisfies the requirement for retirement similar to HP's C1 (§ 2.2). However, it is not satisfied even by Treiber's stack—one of the most basic nonblocking data structures—in that, in FIG. 1, after a successful CAS, head and the referent of cur are aliased and pointing to next at the same time.

Second, Snowflake's API imposes significant syntactic restriction on the use of each thread's local pointers to shared memory. It does not support pointer tagging or pointer-integer casting. Furthermore, local pointers should reside only in the corresponding thread's stack and be used only by the thread. This requirement is also motivated by strong type safety: indeed, unrestricted use of a local pointer may prolong its lifetime across active states, thereby breaking the assumption of epoch consensus. However, it is too restrictive in that (i) pointer tagging and pointer-integer casting is crucially used in a variety of data structures including the linked lists of Harris, Harris-Michael, and Harris-Herlihy-Shavit; (ii) it does not allow local pointers in heap, which is necessary in the presence of implicit boxing; and (iii) it does not allow the use of local pointers by a different thread, which is necessary for multi-threaded asynchronous task executors.

Furthermore, Snowflake's ejection algorithm is actually neither robust nor self-contained in that it uses locks and page faults. Ejection proceeds as follows: when thread A ejects thread B, (i) A enumerates and publishes B's protected local pointers, changes the permission of B's protected pointer list to read-only, and marks B as ejected with holing the "ejection lock" of B; (ii) B notices its ejection via a page fault exception when tracking a new protected local pointer; and (iii) in its page fault handler, B recovers from the ejection with holding its ejection lock. This algorithm is not robust because a non-cooperative thread B may not be ejected when thread A holds B's ejection lock and then sleeps. This algorithm is also not self-contained because it installs a custom page fault handler.

3. Requirements

In this section, PEBR's API using Treiber's stack as example (§ 3.1) is first introduced, its requirements on local pointers and retirement the user should satisfy (§ 3.2 and 3.3, resp.) are presented, and their applicability is discussed (§ 3.4).

3.1. API

PEBR's API is the mixture of that of HP and EBR, providing set_active( ), protect(1), unprotect(1), retire(1), and collect( ) but in addition, it also provides set_quiescent( ) that voluntarily opts out of epoch consensus. It is beneficial for performance because the user is able to keep active states shorter and less hinder epoch advancement and block reclamation. Regardless of whether voluntarily opted out or involuntarily ejected, a thread is safe to dereference its protected local pointers, thereby supporting long-lived pointers spanning across multiple quiescent states.

Treiber's stack presented in FIG. 2 is changed as follows:
(1) Before L16, L13, set_active( ) is inserted.
(2) After L9, L20, set_quiescent( ) is inserted.
(3) Before L16, if (!protect(cur)) {set_active( ) continue;} is inserted.
(4) After L16, unprotected (cur); is inserted.
(5) At L18, free (cur) is replaced with retire(cur).

It is worth noting that the change is the mixture of that for EBR (1,2,5) and that for Snowflake (3,4,5).

Tracking active state's lifespan with set_active( ) and set_quiescent( ) while providing the user with more precise control over the epoch consensus, adds a non-negligible complexity to the API. To mitigate the complexity, PEBR provide a high-level API (§ 4.1). Furthermore, the user may completely opt out of the complexity by requiring threads to be always active unless ejected, relieved from the burden of explicitly tracking active state's lifespan.

Unlike most HP implementations, which support only a finite number of protected local pointer slots, implementation of PEBR supports a statically unknown number of slots using a linked list of fixed-length array of slots. This is essential for supporting e.g., Bonsai tree.

Recall from § 2.4 that Snowflake imposes too strict a requirement on the use of local pointers and the aliasing of pointers, thereby limiting its applicability to nonblocking data structures. On the other hand, PEBR requires more relaxed requirements for safe reclamation as follows.

3.2. Requirements on Local Pointers

Unlike Snowflake, PEBR allows local pointers to be freely tagged, cast to integers, stored in heap, or used by other threads, as far as it satisfies the following requirement:

Requirement 3.1 (protection). Suppose a thread creates a local pointer, say 1, by reading shared memory. Then (i) only the thread may later protect(1); and (ii) set_active( ) is not called between them.

Recall that if protect(1) returns true, then the thread is in an active state at the time of the protection; and furthermore, if Req. 3.1 holds, then 1 should be have been created in the same active state. Req. 3.1 will be statically guaranteed by a high-level API based on an RAII type (§ 4.1 and 4.2).

Like HP and Snowflake, PEBR requires every dereference should have previously been protected successfully.

Requirement 3.2 (dereference). Suppose a thread dereferences a local pointer, say 1. Then protect(1) is called earlier, returning true, and unprotect(1) is not called between the protection and the dereference of 1.

Req. 3.2 will also be statically guaranteed by a high-level API (§ 4.1 and 4.3). Req. 3.1 and 3.2 collectively implies that a local pointer is dereferenced only if it is created and protected in an active state.

It is worth noting that even if protect(1) returns false, the corresponding thread may enter a new active state by calling set_active( ) and resume the remaining operation. While Req. 3.1 forbids the protection of existing local pointers, Req. 3.2 allows the dereference of already protected local pointers to create new local pointers, from which the thread may perform the remaining operation.

3.3. Requirements on Retirement

Recall from § 2.4 that Snowflake's unique owner condition automatically satisfies the requirement for retirement, but it also limits the applicability significantly. On the other hand, PEBR allows multiple pointers to be aliased, and instead imposes the following two requirements for retirement that are widely applicable.

The first requirement is similar to that of HP/EBR that a block should be unlinked from shared memory before retired:

Requirement 3.3 (retirement). Let b be a block. Then b is retired at most once; and b is unlinked from shared memory before retired, or more specifically, for the retirement event R(b) and ever event w writing the pointer value of b to a location, say 1, the following holds:
(i) w happens before R(b); and
(ii) If w is visible to R(b), then blk(1)) happens before R(b), where w is visible to R(b) if there are no intervening write events on 1 that happen after w and before R(b), and blk(1) is the block containing the location 1.

Roughly speaking, (i) means pointer to a retired block should not be rewritten to shared memory, and (ii) means all blocks pointing to a retired block should also have been retired so that they are collectively unlinked and pointer presence as required for retire(1) mentioned in § 2. The same requirement applies to HP and EBR as well. Req. 3.3, however, does not suffice to guarantee safe reclamation for (HP and) PEBR as shown in the following example of Harris's list:

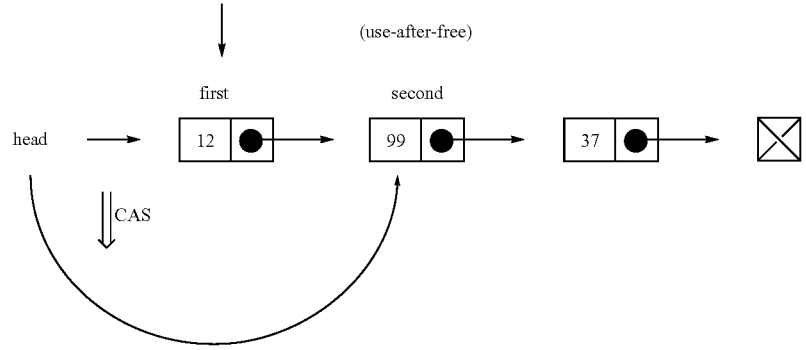

Suppose thread A just detaches and retires two consecutive, logically deleted nodes by a single CAS, and thread B is currently traversing and protecting the first node. Req. 3.3 alone cannot prevent use-after-free for the second node because it is not currently protected and is subject to reclamation, and at the same time, it can be dereferenced during B's traversal from the first node. For this reason, HP is inherently incompatible with Harris's and Harris-Herlihy-Shavit's lists, as discussed in the original HP disclosure. To prevent such an error, PEBR imposes the second requirement for retirement: in essence, a retired block (e.g., the first node) should not be traversed to create a new local pointer (e.g., the second node) in a new active state.

Requirement 3.4 (protection of retired block). Let b be a block, R(b) its retirement event, P(b) be a protection event of b, and a be an active state. Suppose R(b) and P(b) happens before a; and inside a, b is dereferenced to create a new local pointer 1. Then 1 is not protected afterwards.

It is satisfied by Harris's list, when protected by PEBR, because (i) before retired, a node is marked logically deleted, i.e., its "next" pointer is tagged; and (ii) a logically deleted block is not traversed afterwards. Use-after-free is indeed prevented: e.g., if the second node has been reclaimed, then thread B should have been ejected, thereby unable to protect and dereference the second node due to the requirement.

It is worth noting that EBR does not specifically require such a condition thanks to the absence of ejection. In this regard, it may think of Req. 3.4 as the condition to provide EBR's epoch-wide protection to the dereference of retired blocks in the presence of ejection.

3.4 Applicability

The four requirements are satisfied by Treiber's stack. In particular, Req. 3.3 holds because (i) all writes of cur at L8, 9, 17 happen before cur's retirement via release/acquire synchronization from L9 to L14; and (ii) all writes of cur are overwritten before cur's retirement; and Req. 3.4 holds because all traversals are within a single active state. Similarly, they are satisfied by Harris-Michael's list and the other concurrent data structures supported by EBR. Specifically, a data structure implemented in EBR can be ported to PEBR by protecting each dereference to the shared memory. In particular, as far as the original implementation in EBR satisfies Req. 3.3, the ported implementation in PEBR continues to satisfy Req. 3.3 and Req. 3.4 in addition.

PEBR is more applicable than Snowflake, which requires unique owner condition that is not satisfied by most pointer-based nonblocking data structures. In particular, PEBR supports the pointer sharing patterns in implicit boxing and asynchronous task executors. PEBR is strictly more applicable than HP, which does not support Harris's and Harris-Herlihy-Shavit's lists. Furthermore, Reqs. 3.1 to 3.4 are the first characterization of a reclamation scheme's requirement that is validated for Harris's and Harris-Herlihy-Shavit's lists.

4. High-Level API

The four requirements presented in § 3 are more complex than those of the prior schemes and thus cumbersome to satisfy. To mitigate this difficulty, a high-level API of PEBR that statically verifies Reqs. 301 and 3.2 is presented. Specifically, it follows crossbeam in using an RAII type that corresponds to an active state (§ 4.1) and leveraging Rust's ownership-based type to track the lifetime of local pointers (§ 4.2); and it introduces an RAII type that corresponds to a protected local pointer(§ 4.3). The disclosure explains how the high-level API statically guarantees Reqs. 3.1 and 3.2 using Treiber's stack as example (§ 4.4).

4.1 Delimiting Active States with Guards

The disclosure follows Crossbeam in tracking an active state's lifespan using an RAII type, Guard, whose constructor and destructor call set_active( ) and set_quiescent( ) respectively:

```
class Guard {             // representing an active state
    Guard( );             // calling set_active( )
    ~Guard( );            // calling set_quiescent( )
    bool is_active( );    // checking if it's still active
}
```

The existence of a Guard, however, does not guarantee the thread is active because it may be ejected. Thus Guard provides a method, is_active( ) that checks if it is still active. Using this method, it can guarantee a certain code region is executed in an active state as follows:

```
Guard g; foo( );
    if (g.is_active( ))    { /* foo( ) called in active state */ }
```

4.2. Tracking Lifetime of Local Pointers

The disclosure follows Crossbeam again in statically tracking the lifetime of local pointers using Rust's ownership-based types. Specifically, it introduces a new type, Shared<'g, T>, that represents a local pointer that is valid for the 'g:

```
claa Shared <'g, T> {     //local pointer to T w/ lifetime 'g
    private T *ptr;        // underlying pointer val
}
```

In Rust, the annotated lifetime 'g statically guarantees a value of shared<'g, T> does not outlive the lifetime 'g, while allowing the local pointer to be shared to multiple variables in even multiple threads. The lifetime 'g is meant to be that of a Guard, and as a result, a local pointer(i) is created inside an active state, and (ii) exist only inside the same active state unless it is not ejected.

The lifetime constraint is mandated by the following API:

```
class Atomic<T {              // Shared location of T*
    private atomic<T*> ptr;   //underlying pointer val
    Shared<'g, T> load(Guard &'ggrd);
    void store(Shared<'g, T> ptr);
    bool cas(Shared<'g, T> cur, Shared<'g, T> next);
    ... // other memory access methods
}
```

Here, Atomic<T> represents a shared atomic location that holds a pointer to T. This type, instead of raw pointer, should be used to store a pointer value inside concurrent data structures implemented on top of PEBR. Its underlying pointer value is private and readable only via pointer-reading methods, such as load and cas. These methods are given a reference to Guard that is live at least during the lifetime of 'g, and return a Shared<'g, T>, which means the returned local pointer is valid only for 'g. On the other hand, a local pointer can be stored in an Atomic<T> using pointer-writing methods like store and cas. These methods do not specifically require a reference to Guard, as they do not create local pointers. For example:

auto prev=ptr. load (&grd);
auto flag=ptr. cas (prev, next);
ptr. store (next);

PEBR also requires retire and collect be called inside active states so that they are synchronized with epochs. Again, the disclosure statically guarantees this by giving a reference to Guard to the functions:

```
void retire<T>(Shared<'g, T> ptr, Guard &<'g, grd);
void collect(Guard &grd);
```

4.3. Protecting Local Pointers with Shields

It follows Snowflake in maintaining each thread's protected pointer list using an RAII type, Shield<T>, that owns a slot in a list:

```
class Shield<T> {
    Shield( );                                  // ctor, initially null
    bool protect(Shared<[] g, T>ptr, Guard &[]g grd);
    void unprotect( );
    T &deref( );
    ~Shield( );                                 // dtor, unprotecting old ptr
}
```

Its constructor reserves a slot in the calling thread's protected pointer list. After constructed, a shield may (i) protect a local pointer by writing it to the corresponding slot, and return whether the given guard is validated to be still active (i.e., not ejected); (ii) unprotect the protection of pointer by erasing it from the slot; or (iii) dereference the protected pointer. When a shield is destructed or it protects another pointer, the old pointer is automatically unprotected.

A shield is safe to dereference as far as it exists, because the underlying local pointer is unprotected in the shield's destructor. In PEBR, it is statically verified with Rust's ownership based type system. For applicability, it allows a shield to be referenced multiple times, and even by multiple threads by marking it "synched" in Rust's type system. Compare this with Snowflake's strict requirement that a local pointer should reside in the corresponding thread's stack and be used only by the thread. However, the disclosure marks a shield to be neither "Copyable" nor "Sendable" to the other threads in Rust's type system because a protected pointer list slot is an exclusive and thread-local resource.

4.4. Putting It All Together

Requirements: The high-level API introduced so far collectively guarantees Reqs. 3.1 and 3.2 statically. Req. 3.1 means a local pointer created inside an active state should be protected only inside the same active state, and Req. 3.2 means only those protected local pointers are dereferenced. First, Req. 3.1 holds because (i) a local pointer should be created inside the lifespan of a guard, as required by the API of Atomic; (ii) the local pointer should be protected inside the lifespan of the same guard, as required by the API of Shield; and (iii) the validation inside protect guarantees the guard corresponds to an active state. Second, Req. 3.2 holds directly from the API of Shield: only protected local pointers in shields may be dereferenced.

Applicability: The high-level API is widely applicable, e.g., the disclosure used the API to implement all the microbenchmarks the disclosure used for evaluation, including Treiber's stack and Harris's, Harris-Michael's, and Harris-Herlihy-Shavit's lists.

Example: FIG. 5 presents Treiber's stack protected with PEBR using the API introduced so far. (L6-11, 16-24) the push and pop operations are delimited by Guards; (L8, 10, 17, 21) pointer-reading operations are given a reference to Guard; (L14) a shield is created; (L19) a shield tries to protect the local pointer cur by writing it to the thread's protected pointer list, and if unsuccessful, retry from the beginning; (L20, 25) after protected, a local pointer is dereferenced via the shield; and (L26) the protection is unprotected after an attempt to pop has finished. It is worth noting that while (L19) a local pointer should be protected inside an active state, (L25) the corresponding shield may be safely dereferenced outside of the active state.

5. Algorithm

In this section, PEBR's algorithm is explained with a focus on hazard-epoch consensus that generalizes EBR's epoch consensus (§ 5.1). PEBR's algorithm is inspired by Snowflake's, which also employs a hazard-epoch consensus, protection, and ejection. The disclosure will clearly state which design is adopted from Snowflake and which is the disclosure's own.

5.1. Hazard-Epoch Consensus

PEBR's hazard-epoch consensus is an enhancement of EBR's epoch consensus to also take into account protected pointers. For example, see the event graph of hazard-epoch consensus presented in FIG. 4. Like in EBR, it is enforced that, for each A(e), (i) G(e) happens before B(e), and (ii) E(e) happens before G(e+2). Like in HP, the set of protected local pointers—each of which is protected inside the same active state as it is created, as discussed in § 3.2—are tracked and published so that the other threads refrain from reclaiming the published pointers. Like in Snowflake, a block may be reclaimed in an active state pinned at e if (i) it is retired in an active state pinned at e−3 or earlier; and (ii) it is not currently published as protected by any threads.

Figure 4:
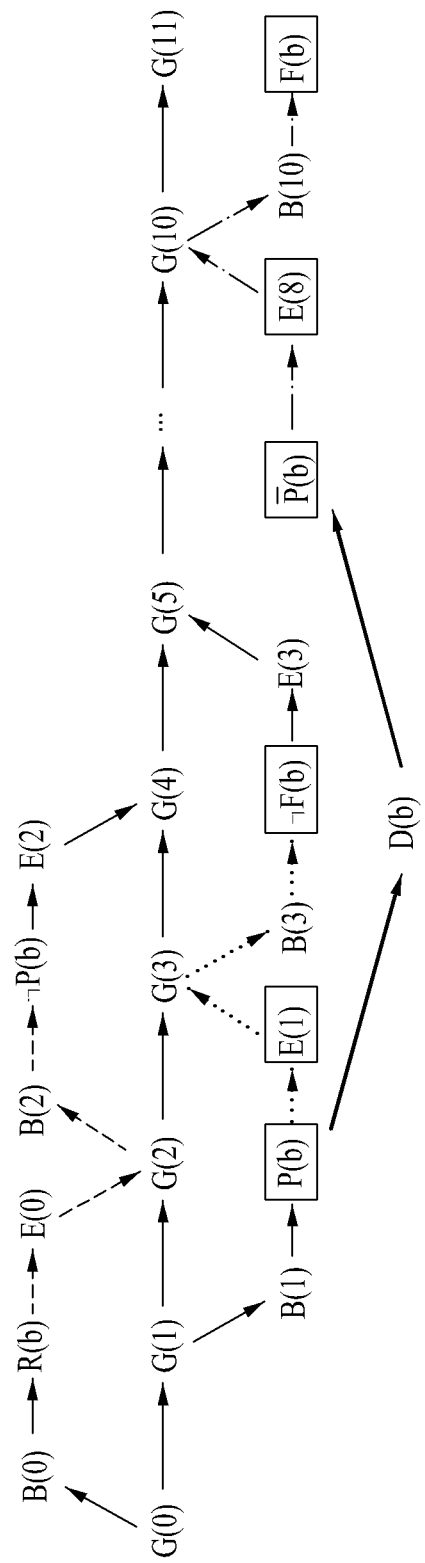
FIG. 4 is a drawing illustrating a hazard-epoch consensus example.

PEBR's consensus prevents use-after-free errors similarly to EBR's and Snowflake's. Notable differences from EBR's epoch consensus illustrated in FIG. 3 are boxed. As before, (-- ▶ ) a local pointer to b cannot be created and protected inside active states pinned at 2 (or later). (E(1)) the fact that b is protected is published at the end of A(1); (¬F(b), ···▶ ) in the recognition of the protection of b through E(1), G(3), and B(3), b is not reclaimed in collect; (D(b), $\overline{P}(b)$, ——▶ ) the block b can be dereferenced after it is protected and before it is unprotected, regardless of whether it is inside an active state: (E(8)) the fact that b is no longer protected is published at the end of A(8); finally, (F(b), —·▶ ) every dereference of b happens before P(b), E(8), G(10), B(10), and then F(b), preventing use-after errors. PEBR's hazard-epoch consensus is similar to Snowflake's, as shown in FIG. 4, but (i) the ownership transferred through the happens-before relation is more complicated in PEBR to support pointer aliasing and sharing (§ 3.2); and more importantly, (ii) the consensus should also take into account the asynchronous nature of nonblocking ejection. In the rest of this section, it explains how to synchronize nonblocking ejection with epoch (§ 5.2) and local pointer protection (§ 5.3). Then it explains the nonblocking ejection algorithm itself (§ 5.4).

5.2. Synchronization of Epoch

Hazard-epoch consensus assumes that for each A(e), (i) G(e) happens before B(e), and (ii) E(e) happens before G(e+2). To enforce this, active states and global epoch are implemented and synchronized as follows.

Let G be the shared variable that contains the global epoch, and Li be the shared variable that contains the local epoch of i-th be thread. To create an active state, say A(e), the disclosure (B1) reads the value e from the global epoch; (B2) writes it to the local epoch; (B3) issues a Raw-synchronizing fence; and (B4) validates whether the global epoch is still e, and otherwise, retries from the beginning. The last step is required to make sure the thread is not asynchronously ejected in-between. To destroy an active state, the disclosure (E1) writes a sentinel value to the local epoch. To advance the global epoch, the disclosure (A1) reads the value e from the global epoch; (A2) issues a RAR-synchronizing (read-after-read) fence; (A2) checks whether the local epoch of each thread is either e or the sentinel; and (A4) only if it is the case, advances the global epoch to e+1 by CAS.

G(e) happens before B(e) because A4 happens before B1 via release/acquire synchronization. On the other hand, E(e) happens before G(e+2) for the following reason. Because B4 reads an older value from G than A1 does, B3 happens before A2. Thus B2's write to Li is visible to A3's read. Then to proceed to A4, E(e)'s write to Li or a later write is read in A3, and by release/acquire synchronization, E(e) happens before G(e+2).

5.3. Synchronization of Local Pointer Protection

The disclosure follows Snowflake in publishing protected pointer lists only at the end of active states. It is safe because a protection needs to be recognized only at the end of its enclosing active state, as illustrated in FIG. 4 (···▶). In particular, when a local pointer is protected entirely inside an active state, then the protection is not published at all. As a result, unprotection may not immediately affect reclamation until the end of a later active state. For example. $\overline{P}(b)$ in FIG. 4 happens outside of any active states, and its effect is published only at E(8).

The disclosure also follows Snowflake in approximately compressing protected pointer lists using bloom filters to reduce the number of iterations over the lists. At the end of an active state (e.g., E(1)), the corresponding thread's protected pointer list is approximated as a bloom filter and then published along with its local epoch; and when the global epoch is advanced (e.g., to G(3)), the bloom filters published by all threads are gathered, merged into a single bloom filter by union, and then published along with the global epoch. The global bloom filter is then retrieved at the beginning of an active state (e.g., E(3)) and used to prevent the reclamation of protected blocks (e.g., ¬F(b)) in collect. As a side benefit, cache locality is improved because each thread's protected pointer lists become mostly thread-local (accessed by the other threads only when it is ejected, to be described below).

The over-approximation is safe because it merely hinders the reclamation of retired blocks. While it renders PEBR not strictly robust, it is probabilistically robust in that only 2.55% of the unprotected retired blocks are not reclaimed due to the over-approximation on average, when there are 128 protected pointers in total and bloom filters are 128 bytes with 8 hashes. In implementation, the disclosure uses that size of bloom filters and each double-byte chunk of 128—but MurmurHash3 result as hashes.

For robustness, the disclosure synchronizes epochs and bloom filters in a nonblocking manner. The disclosure's idea is putting the pointer to a bloom filter and an epoch in a single-word status so that the disclosure can perform CAS on it. Status is fit into a word because a pointer to 128-byte bloom filters allows 7 bits for tagging, and the disclosure needs only 3 bits for epoch (as the disclosure does not need to distinguish more than 5 epochs: 3 for retired blocks and 2 for epoch skew) and 1 bit for pinning (representing whether the thread is inside an active state). As a result, the disclosure can simultaneously publish the epoch number and the bloom filter for local and global epochs by performing CAS. The status word will also be crucially used in synchronization with ejection, to the described below.

5.4. Nonblocking Ejection

The disclosure follows Snowflake in ejecting non-cooperative threads (i.e., involuntarily destroying their active states) to guarantee robustness. Unlike Snowflake's ejection algorithm, which is neither self-contained (due to its reliance on page fault handler) nor robust in a strict sense (due to its use of locks), PEBR's ejection algorithm is self-contained and robust by synchronizing with hazard-epoch consensus in a nonblocking manner as follows.

The ejecting and ejected threads are synchronizing with each other on the ejected thread's status word. To do so, in the remaining bits of status word, the disclosure additionally stores a flag representing whether the thread is (being) ejected. Let Epoch, Pin, and Eject be the corresponding tags of a status. The ejecting thread, say A, changes the status word of the ejected thread, say B, as follows.

A1. Mark B's Eject by performing CAS on B's status.

A2. Read B's protected pointer list and approximates it as a bloom filter.

A3. Update B's status by performing CAS to the new status with the approximated bloom filter, arbitrary Epoch, unmarked Pin, and marked Ejected.

The purpose of A1 is to notify B with the intention to eject it, and that of A2 and A3 is to ensure that B's protected pointers are published as B is ejected. This process is lock-free: in particular, another thread, say C, may concurrently eject B as well, and even though C fails on the A1's CAS, it recognizes the fact that B is being ejected and helps A to eject B by executing the A2 and A3.

When being ejected, thread B is notified with the ejection and gracefully handles it in protection, retirement, and collection operations as follows.

Synchronizing with Protection: Recall from § 3.2 that the function protect adds the given local pointer to the protected pointer list, and then validates if the thread is not ejected. Specifically, the validation interacts with the status word as follows.

B1. Write the local pointer to the protected pointer list.

B2. Read its status word.

B3. If its Eject bit is marked, then the thread is (being) ejected, so fail the protection operation.

Ejection synchronizes with protection via the status word as follows. Let A be an ejecting thread and B be an ejected thread B that is about to protect a local pointer. Depending on execution order, there are two cases: A1 happens before B2; or B1 happens before A1. In the former case, B2 should read its status word with Eject marked, and B3 fails to protect the given local pointer. In the latter case, A2 should read the local pointer written in B1, and A3 publishes the protection in a bloom filter. In both cases, a successfully protected local pointer in B is always published in its bloom filter at the end of an active state, regardless of whether B is ejected.

Like in HP, the case analysis above is sound only if the disclosure enforces the order between A1's write (and B1's) and A2's read (and B2's, resp.) by issuing RAW-synchronizing fences. To reduce synchronization cost, the disclosure follows Dice et, al. to use only complier fence (not appearing in binary) in hot path, which is B in the disclosure's case, at the expense of higher synchronization cost of process-wide memory fence in cold path, which is A in the disclosure's case.

Synchronizing with Retirement and Collection: Hazard-epoch consensus requires retire and collect be called inside active states, so they are given a reference to Guard in the high-level API (§ 4.2). However, even with a reference to Guard, the corresponding thread may have been ejected and thus not active. To proceed even in case of ejection, these functions synchronize with ejection as follows. They first read the thread's status word, and if its Eject bit is not marked, then use the local epoch; otherwise, as a fallback, read and use the global epoch. The global epoch is safe to use because these functions just need to recognize the fact that a certain global epoch has reached (i.e., for some e, G(e) happened before). As a result, these functions always succeed even if the thread is ejected.

6. Properties

PEBR is safe. The disclosure proves the safety of PEBR's hazard-epoch consensus provided that the requirements are satisfied.

Theorem 6.1 (Safety). If Reqs. 3.1 to 3.4 are satisfied, then use-after-free errors do not occur for memory blocks managed by PEBR.

Proof. Let b be a memory block managed by PEBR, and assume its retirement R(b) happens inside an active state pinned at epoch e. Suppose the protection of b is published at the viewpoint of G(e+3), G(e+4), . . . G(f−1) but is not at that of G(f). Then the reclamation F(b) may happen inside an active state pinned at f or later.

Consider each dereference D(b) to b. By assumption, D(b) is protected inside an active state, say a. The disclosure proves a should be pinned at e+1 or earlier. Suppose otherwise: a is pinned at e+2 or later. By Reqs. 3.1 and 3.2, a local pointer to b is created inside a by a read event, say r, from a location, say 1. Let w be the write event from which r reads from. Let b'=blk(1). Then the disclosure has:

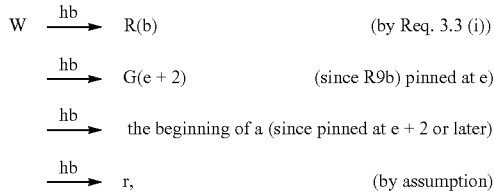

where

denotes the happens-before relation. Since r reads from w, w is visible to r and thus to R(b). By Req. 3.3 (ii), R(b') happens before R(b). By Req. 3.4, b' should be protected inside a before b is. Thus recursively, an unbounded number of local pointers to b", b'", . . . should be crated and protected inside a before b, contradicting the finiteness of execution. Contrapositively, a should be pinned at e+1 or earlier. The rest of the proof is largely the same with that of Snowflake's. A protection of b is eventually released because the protection is not published at the viewpoint of G(f). In particular, such a unprotect event happens before the end of an active state, say a', of a thread pinned at f−2 or earlier. Let P(b) be such a release event. Then D(b) happens before P(b), the end of a', G(f), and F(b), thereby preventing use-after-free errors.

Furthermore, PEBR's safety is tested using harsh parameters (e.g. ejecting the other threads for every 8 active states) and LLVM AddressSanitizer.

PEBR is robust. Non-cooperative threads are ejected to guarantee epoch advancement and block reclamation. As a result, memory usage remains roughly the same even in the presence of non-cooperative threads in the disclosure's experiment (§ 7).

PEBR is fast. Specifically, it neither issues expensive RAW-synchronizing fence nor incurs memory indirection for each dereference. While tracking protected local pointers incurs runtime overhead, it is less than 15% compared to EBR in the disclosure's experiment (§ 7).

PEBR is compact. It requires only global and per-thread metadata, and does not incur per-block space overhead for, e.g., reference counters or epochs.

PEBR is self-contained. It is efficiently implementable with the standard C18/C++17 relaxed-memory concurrency and process-wide memory fence, the latter of which is widely available to user-space programs on Linux and Windows, and is being standardized in C/C++. The disclosure implemented and tested PEBR in Linux and Windows. Furthermore, it does not intrusively affect execution environment, e.g., by installing an interrupt handler.

PEBR is widely applicable. As discussed in § 3.4, PEBR is more applicable than HP, at least for Harris's list and Harris-Herlihy-Shavit's list; at least as applicable as EBR; and more applicable than Snowflake. Furthermore, it allows pointer operations that are widely used in concurrent programming, such as pointer aliasing, pointer tagging, and RMW operations. Also, it supports statically unknown number of protected pointers, which are essentially used for, e.g., Bonsai tree.

Figure 6:
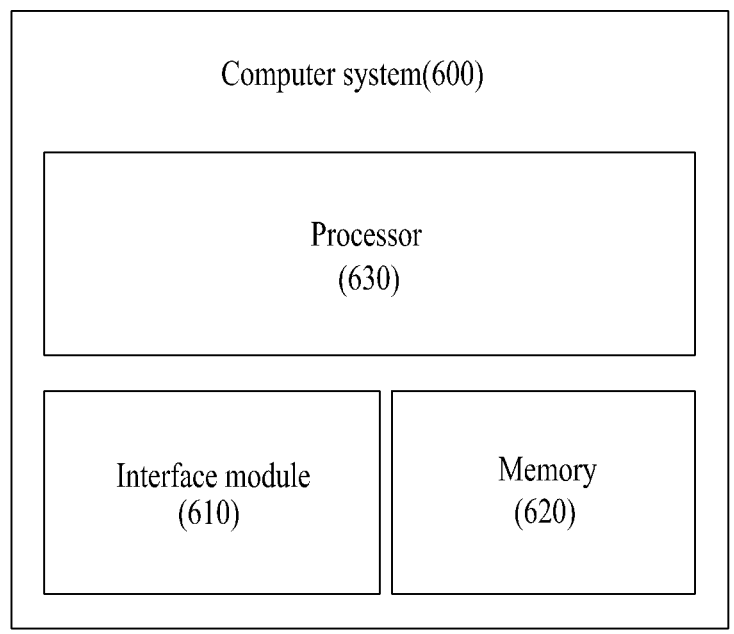
FIG. 6 is a drawing illustrating a computer system according to various example embodiments.

FIG. 6 is a drawing illustrating a computer system 600 according to various example embodiments.

Referring to FIG. 6, the computer system 600 according to various example embodiments may include at least one of an interface module 610, a memory 620, or a processor 630. In some example embodiments, at least any one of the components of the computer system 600 may be omitted, and at least another component may be added. In some example embodiments, at least two of the components of the computer system 600 may be implemented into one integrated circuit.

The interface module 610 may provide an interface for the computer system 600. According to one example embodiment, the interface module 610 may include a communication module, and the communication module may perform communication with an external device. The communication module may establish communication channel between external devices, and perform communication with external devices through communication channel. The communication module may include at least one of wired communication module or wireless communication module. The wired communication module may be connected with external devices with wire and communicate on wire. The wireless communication module may include at least one of near field communication module and telecommunication module. The near field communication module may communicate with external devices with near field communication method. The telecommunication module may communicate with external devices with telecommunication method. Here, the telecommunication module may communicate with the external devices through wireless network. According to another example embodiment, the interface module 610 may include at least one of an input module or an output module. The input module may input signal to be used at least one component of the computer system 600. The input module may include at least one of an input device configured to input signal directly to the computer system 600 by a user, a sensor device configured to generate signal by sensing surrounding environment, or a camera module configured to generate image data by taking image. The output module may include at least one of display module for visually displaying information or an audio module for outputting information into audio signal.

The memory 620 may store various data used by at least one component of the computer system 600. For example, the memory 620 may include at least one of volatile memory and nonvolatile memory. Data may include at least one program and input data or output data related thereto. The program may be stored as software including at least one instruction in the memory 620.

The processor 630 may control at least one component of the computer system 600 by executing the program of the memory 620. Through this, the processor 630 may perform data process or operation. At this time, the processor 630 may execute instruction stored in the memory 620.

The processor 630 may implement a pointer and epoch-based memory reclamation scheme by hybridizing a pointer-based memory reclamation scheme and an epoch-based memory reclamation scheme. At this time, the processor 630 may hybridize functions of the epoch-based memory reclamation scheme with functions of the pointer-based memory reclamation scheme, and through this, the pointer and epoch-based memory reclamation scheme may be implemented. In addition, the processor 630 may implement the pointer and epoch-based memory reclamation scheme to satisfy the above described Reqs. 3.1 and 3.2. According to this, the processor 630 may perform concurrent data structures based on the pointer and epoch-based memory reclamation scheme.

Figure 7:
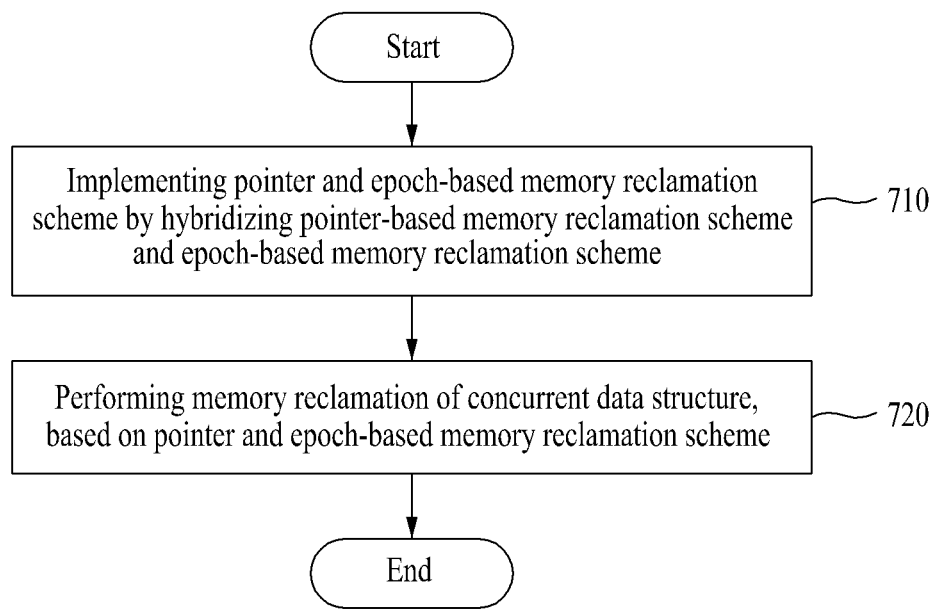
FIG. 7 is a drawing illustrating a method by a computer system according to various example embodiments.

FIG. 7 is a drawing illustrating a method by a computer system 600 according to various example embodiments.

Referring to FIG. 7, the computer system 600 may implement a pointer and epoch-based memory reclamation scheme by hybridizing a pointer-based memory reclamation scheme and an epoch-based memory reclamation scheme in Step 710. The processor 630 may hybridize functions of the epoch-based memory reclamation scheme with functions of the point-based memory reclamation scheme, and through this, the pointer and epoch-based memory reclamation scheme may be implemented.

The functions of the pointer-based memory reclamation scheme may include at least one of protect(I) for adding a local pointer(I) to a protected pointer list so that the local pointer(I) specified in a shared memory is protected by a thread, unprotect(I) for removing a local pointer(I) in the protected pointer list, retire(I) for reclaiming for a local pointer(I) in the protected pointer, or collect( ) for reclaiming for a local pointer not in the protected pointer list. The functions of the epoch-based memory reclamation scheme may include at least one of set_active( ) for setting a thread to access the shared memory in an active state, set_quiescent( ) for setting a thread not to access the shared memory in a quiescent state, retire(I) for reclaiming for a local pointer(I) created for a thread in an active state, or collect( ) for reclaiming for a local pointer retired for a thread in an active state. Through this, the pointer and epoch-based memory reclamation scheme may be implemented with at least two of set_active( ) set_quiescent( ) protect(I), unprotect(I), retire(I), or collect( ).

The processor 630 may implement the pointer and epoch-based memory reclamation scheme to satisfy the above described Reqs. 3.1 and 3.2. When protect(1) is true, Req. 3.1 may represent a protection requirement that a local pointer(I) is created in a same active state by a thread reading the shared memory in the active state. When protect (1) is true, for Req. 3.2, the pointer and epoch-based memory reclamation scheme may represent a dereference requirement that the unprotect(1) is not called between protection and dereference of the created local pointer(1).

The processor 630 may implement the pointer and epoch-based memory reclamation scheme based on an ejection algorithm. The processor 630 may synchronize an ejecting thread and an ejected thread with each other on the ejected thread's status word. In addition, the ejecting thread is configured to change the ejected thread's status word. Specifically, the processor 630 may mark a flag representing the ejected thread is ejected in remaining bits of the status word, based on the ejected thread's status. After this, the processor 630 may be configured to update the ejected thread's status, based on the protected pointer list of the ejected thread.

According to this, the computer system 600 may perform the memory reclamation of the concurrent data structure, based on the pointer and epoch-based memory reclamation scheme at Step 720. The computer system 600 may use less memory, be fast, be applied to many data structures, and reclaim all memory, by using the pointer and epoch-based memory reclamation scheme that the pointer-based memory reclamation scheme and the epoch-based memory reclamation scheme are hybridized. It also may perform optimization to reduce memory use of the system and high-performance software, to lower latency, and to increase throughput by applying the pointer and epoch-based memory reclamation scheme.

The pointer and epoch-based memory reclamation scheme may be applied to most system software and high-performance software that require concurrent data. It may be applied to e.g., data structures frequently accessed by multiple threads simultaneously in an operating system, page tables, scheduling tables, and b-trees, and the like, it may be applied to stamp generators, concurrent control, hash tables, and the like in a database management system, and it may be applied to DNS table, packet offloading, and the like in a networking system. Since all systems and high-performance software should be operated well in corner case, the pointer and epoch-based memory reclamation scheme having all required properties as a reclamation scheme may be usefully used. Through this, it is expected that great performance may be gained if the pointer and epoch-based memory reclamation scheme is applied to the system and high-performance software. Therefore, it is expected to achieve huge cost savings in the case of a company operating a huge cloud.

A method of computer system 600 according to various example embodiments may include implementing a pointer and epoch-based memory reclamation scheme by hybridizing a pointer-based memory reclamation scheme and an epoch-based memory reclamation scheme, and performing a memory reclamation of a concurrent data structure, based on the pointer and epoch-based memory reclamation scheme.

According to various example embodiments, the implementing the pointer and epoch-based memory reclamation scheme may implement the pointer and epoch-based memory reclamation by using functions of the pointer-based memory reclamation.

According to various example embodiments, the functions of the pointer-based memory reclamation scheme comprise at least one of protect(I) for adding a local pointer (I) to a protected pointer list so that the local pointer(I) specified in a shared memory is protected by a thread, unprotect(I) for removing a local pointer(I) in the protected pointer list, retire(I) for reclaiming for a local pointer(I) in the protected pointer, or collect( ) for reclaiming for a local pointer not in the protected pointer list.

According to various example embodiments, the implementing the pointer and epoch-based memory reclamation scheme may implement the pointer and epoch-based memory reclamation scheme by using functions of the epoch-based memory reclamation scheme, with the functions of the pointer-based memory reclamation scheme.

According to various example embodiments, the functions of the epoch-based memory reclamation scheme comprise at least one of set_active( ) for setting a thread to access the shared memory in an active state, set_quiescent( ) for setting a thread not to access the shared memory in a quiescent state, retire(I) for reclaiming for a local pointer(I) created for a thread in an active state, or collect( ) for reclaiming for a local pointer retired for a thread in an active state.

According to various example embodiments, the pointer and epoch-based memory reclamation scheme satisfies a protection requirement that a local pointer(I) is created in a same active state by a thread reading shared memory in the active state, when the protect(1) is true.

According to various example embodiments, the pointer and epoch-based memory reclamation scheme satisfies a dereference requirement that the unprotect(1) is not called between protection and dereference of the created local pointer(1), when the protect(1) is true.

According to various example embodiments, the implementing the pointer and epoch-based memory reclamation scheme may include synchronizing an ejecting thread and an ejected thread with each other on the ejected thread's status word, and changing the ejected thread's status word by the ejecting thread.

According to various example embodiments, the changing the status word may include marking a flag representing the ejected thread is ejected in remaining bits of the status word, based on the ejected thread's status, and updating the ejected thread's status, based on a protected pointer list of the ejected thread.

The computer system 600 according to various example embodiments may include the memory 620, and the processor 630 connected to the memory 620 and configured to execute at least one instruction stored in the memory 620.

According to various example embodiments, the processor 630 may be configured to implement a pointer and epoch-based memory reclamation scheme by hybridizing a pointer-based memory reclamation scheme and an epoch-based memory reclamation scheme, and perform a memory reclamation of a concurrent data structure, based on the pointer and epoch-based memory reclamation scheme.

According to various example embodiments, the processor 630 implements the pointer and epoch-based memory reclamation scheme by using functions of the pointer-based memory reclamation scheme.

According to various example embodiments, the functions of the pointer-based memory reclamation scheme may include at least one of protect(I) for adding a local pointer(I) to a protected pointer list so that the local pointer(I) specified in a shared memory is protected by a thread, unprotect(I) for removing a local pointer(I) in the protected pointer list, retire(I) for reclaiming for a local pointer(I) in the protected pointer, or collect( ) for reclaiming for a local pointer not in the protected pointer list.

According to various example embodiments, the functions of the epoch-based memory reclamation scheme may include at least one of set_active( ) for setting a thread to access the shared memory in an active state, set_quiescent( ) for setting a thread not to access the shared memory in a quiescent state, retire(I) for reclaiming for a local pointer(I) created for a thread in an active state, or collect( ) for reclaiming for a local pointer retired for a thread in an active state.

According to various example embodiments, the pointer and epoch-based memory reclamation scheme may satisfy a protection requirement that a local pointer(I) is created in a same active state by a thread reading shared memory in the active state, when the protect(1) is true.

According to various example embodiments, the pointer and epoch-based memory reclamation scheme may satisfy a dereference requirement that the unprotect(1) is not called between protection and dereference of the created local pointer(1), when the protect(1) is true.

According to various example embodiments, the processor 630 may be configured to synchronize an ejecting thread and an ejected thread with each other on the ejected thread's status word, and change the ejected thread's status word by the ejecting thread.

According to various example embodiments, the processor 630 may be configured to mark a flag representing the ejected thread is ejected in remaining bits of the status word, based on the ejected thread's status, and update the ejected thread's status, based on a protected pointer list of the ejected thread.

The units described herein may be implemented using hardware components, software components, and/or a combination thereof. For example, a processing device may be implemented using one or more general-purpose or special purpose computers, such as, for example, a processor, a controller and an ALU (arithmetic logic unit), a digital signal processor, a microcomputer, a FPGA (field programmable gate array), a PLU (programmable logic unit), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied in any type of machine, component, physical or virtual equipment, computer storage medium or device to provide instructions or data to or be interpreted by the processing device. The software also may be distributed over network coupled computer systems so that the software is stored and executed in a distributed fashion. In particular, the software and data may be stored by one or more computer readable recording mediums.

The method according to the example embodiments may be implemented in a form of program instruction which may be performed through various computer means and recorded in computer-readable media. The media may also include, alone or in combination with the program instructions, data files, data structures, and the like. The media may be continuously storing a program which may be executed with a computer, or temporarily storing for execution or download. Also, the media may be various recording means or storing means in a form of single or a plurality of hardware which are combined, but it is not limited to a media directly accessed to any computer system, and it may be distributed on network. Examples of the media include magnetic media such as hard disks, floppy disks, and magnetic tape; optical media such as CD ROM disks and DVD; magneto-optical media such as floptical disks; and hardware devices that are specially configured to store and perform program instructions, such as ROM (read-only memory), RAM (random access memory), flash memory, and the like. Furthermore, other examples of the medium may include an app store in which apps are distributed, a site in which various pieces of other software are supplied or distributed, and recording media and/or storage media managed in a server.

It should be understood that various embodiments of this document and terms used in the embodiments do not limit technology described in this document to a specific embodiment and include various changes, equivalents, and/or replacements of a corresponding embodiment. The same reference numbers are used throughout the drawings to refer to the same or like parts. Unless the context otherwise clearly indicates, words used in the singular include the plural, and the plural includes the singular. In this document, an expression such as "A or B" and "at least one of A or/and B", "A, B or, C" or "at least one of A, B, or/and C" may include all possible combinations of together listed items. An expression such as "first" and "second" used in this document may indicate corresponding components regardless of order or importance, and such an expression is used for distinguishing a component from another component and does not limit corresponding components. When it is described that a component (e.g., a first component) is "(functionally or communicatively) coupled to" or is "connected to" another component (e.g., a second component), it should be understood that the component may be directly connected to the another component or may be connected to the another component through another component (e.g., a third component).

The term "module" used herein may include a unit including hardware, software, or firmware, and, for example, may be interchangeably used with the terms "logic," "logical block," "component" or "circuit". The "module" may be an integrally configured component or a minimum unit for performing one or more functions or a part thereof. For example, the "module" be configured in the form of an Application-Specific Integrated Circuit (ASIC).

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. A method of a computer system, wherein the method comprises:
    implementing a pointer and epoch-based memory reclamation scheme by hybridizing a pointer-based memory reclamation scheme and an epoch-based memory reclamation scheme; and
    performing a memory reclamation of a concurrent data structure, based on the pointer and epoch-based memory reclamation scheme,
    wherein the implementing the pointer and epoch-based memory reclamation scheme implements the pointer and epoch-based memory reclamation scheme by using functions of the pointer-based memory reclamation scheme,
    wherein the functions of the pointer-based memory reclamation scheme comprise at least one of:
    protect(I) for adding a local pointer(I) to a protected pointer list so that the local pointer(I) specified in a shared memory is protected by a thread,
    unprotect(I) for removing a local pointer(I) in the protected pointer list,
    retire(I) for reclaiming for a local pointer(I) in the protected pointer, or
    collect( ) for reclaiming for a local pointer not in the protected pointer list.

2. The method of claim 1, wherein the implementing the pointer and epoch-based memory reclamation scheme implements the pointer and epoch-based memory reclamation scheme by using functions of the epoch-based memory reclamation scheme, with the functions of the pointer-based memory reclamation scheme,
    wherein the functions of the epoch-based memory reclamation scheme comprise at least one of:
    set_active( ) for setting a thread to access the shared memory in an active state,
    set_quiescent( ) for setting a thread not to access the shared memory in a quiescent state,
    retire(I) for reclaiming for a local pointer(I) created for a thread in an active state, or
    collect( ) for reclaiming for a local pointer retired for a thread in an active state.

3. The method of claim 2, wherein the pointer and epoch-based memory reclamation scheme satisfies a protection requirement that a local pointer(I) is created in a same active state by a thread reading shared memory in the active state, when the protect(1) is true.

4. The method of claim 3, wherein the pointer and epoch-based memory reclamation scheme satisfies a dereference requirement that the unprotect(1) is not called between protection and dereference of the created local pointer(1), when the protect(1) is true.

5. The method of claim 1, wherein the implementing the pointer and epoch-based memory reclamation scheme comprises:
    synchronizing an ejecting thread and an ejected thread with each other on the ejected thread's status word; and
    changing the ejected thread's status word by the ejecting thread.

6. The method of claim 5, wherein the changing the status word comprises:
    marking a flag representing the ejected thread is ejected in remaining bits of the status word, based on the ejected thread's status; and
    updating the ejected thread's status, based on a protected pointer list of the ejected thread.

7. A computer system, comprising:
    a memory; and
    a processor connected to the memory and configured to execute at least one instruction stored in the memory,
    wherein the processor is configured to implement a pointer and epoch-based memory reclamation scheme by hybridizing a pointer-based memory reclamation scheme and an epoch-based memory reclamation scheme, and perform a memory reclamation of a concurrent data structure, based on the pointer and epoch-based memory reclamation scheme, wherein the processor implements the pointer and epoch-based memory reclamation scheme by using functions of the pointer-based memory reclamation scheme, wherein the functions of the pointer-based memory reclamation scheme comprise at least one of:

protect(I) for adding a local pointer(I) to a protected pointer list so that the local pointer(I) specified in a shared memory is protected by a thread, unprotect(I) for removing a local pointer(I) in the protected pointer list, retire(I) for reclaiming for a local pointer(I) in the protected pointer, or collect( ) for reclaiming for a local pointer not in the protected pointer list.

8. The computer system of claim 7, wherein the processor implements the pointer and epoch-based memory reclamation scheme by using functions of the epoch-based memory reclamation scheme, with the functions of the pointer-based memory reclamation scheme, wherein the functions of the epoch-based memory reclamation scheme comprise at least one of:

set_active( ) for setting a thread to access the shared memory in an active state, set_quiescent( ) for setting a thread not to access the shared memory in a quiescent state, retire(I) for reclaiming for a local pointer(I) created for a thread in an active state, or collect( ) for reclaiming for a local pointer retired for a thread in an active state.

9. The computer system of claim 8, wherein the pointer and epoch-based memory reclamation scheme satisfies a protection requirement that a local pointer(I) is created in a same active state by a thread reading shared memory in the active state, when the protect(1) is true.

10. The computer system of claim 9, wherein the pointer and epoch-based memory reclamation scheme satisfies a dereference requirement that the unprotect(1) is not called between protection and dereference of the created local pointer(1), when the protect(1) is true.

11. The computer system of claim 7, wherein the processor is configured to synchronize an ejecting thread and an ejected thread with each other on the ejected thread's status word, and change the ejected thread's status word by the ejecting thread.

12. The computer system of claim 11, wherein the processor is configured to mark a flag representing the ejected thread is ejected in remaining bits of the status word, based on the ejected thread's status, and update the ejected thread's status, based on a protected pointer list of the ejected thread.

13. A non-transitory computer-readable medium for storing at least one program, wherein the computer-readable medium is configured to execute:

implementing a pointer and epoch-based memory reclamation scheme by hybridizing a pointer-based memory reclamation scheme and an epoch-based memory reclamation scheme; and performing a memory reclamation of a concurrent data structure, based on the pointer and epoch-based memory reclamation scheme, wherein the implementing the pointer and epoch-based memory reclamation scheme implements the pointer and epoch-based memory reclamation scheme by using functions of the pointer-based memory reclamation scheme, wherein the functions of the pointer-based memory reclamation scheme comprise at least one of:

protect(I) for adding a local pointer(I) to a protected pointer list so that the local pointer(I) specified in a shared memory is protected by a thread, unprotect(I) for removing a local pointer(I) in the protected pointer list, retire(I) for reclaiming for a local pointer(I) in the protected pointer, or collect( ) for reclaiming for a local pointer not in the protected pointer list.

14. The computer readable medium of claim 13, wherein the implementing the pointer and epoch-based memory reclamation scheme implements the pointer and epoch-based memory reclamation scheme by using functions of the epoch-based memory reclamation scheme, with the functions of the pointer-based memory reclamation scheme, wherein the functions of the epoch-based memory reclamation scheme comprise at least one of:

set_active( ) for setting a thread to access the shared memory in an active state, set_quiescent( ) for setting a thread not to access the shared memory in a quiescent state, retire(I) for reclaiming for a local pointer(I) created for a thread in an active state, or collect( ) for reclaiming for a local pointer retired for a thread in an active state.

15. The computer readable medium of claim 14, wherein the pointer and epoch-based memory reclamation scheme satisfies:

a protection requirement that a local pointer(I) is created in a same active state by a thread reading shared memory in the active state, when the protect(1) is true; and a dereference requirement that the unprotect(1) is not called between protection and dereference of the created local pointer(1), when the protect(1) is true.

16. The computer readable medium of claim 13, wherein the implementing the pointer and epoch-based memory reclamation scheme comprises:

synchronizing an ejecting thread and an ejected thread with each other on the ejected thread's status word; and changing the ejected thread's status word by the ejecting thread.

17. The computer readable medium of claim 16, wherein the changing the status word comprises:

marking a flag representing the ejected thread is ejected in remaining bits of the status word, based on the ejected thread's status; and updating the ejected thread's status, based on a protected pointer list of the ejected thread.

* * * * *